(12) United States Patent
Glen

(10) Patent No.: US 6,774,903 B1
(45) Date of Patent: Aug. 10, 2004

(54) PALETTE ANTI-SPARKLE ENHANCEMENT

(75) Inventor: David Glen, Toronto (CA)

(73) Assignee: ATI International SRL, West Indies (BB)

( * ) Notice: Subject to any disclaimer, the term of this patent is extended or adjusted under 35 U.S.C. 154(b) by 278 days.

(21) Appl. No.: 09/707,037

(22) Filed: Nov. 6, 2000

(51) Int. Cl.$^7$ .............................................. G06F 13/18
(52) U.S. Cl. ...................................... 345/535; 348/441
(58) Field of Search .................. 348/441; 345/501–506, 345/519–520, 522, 530–574

(56) References Cited

U.S. PATENT DOCUMENTS

| | | | | |
|---|---|---|---|---|
| 5,815,167 A | * | 9/1998 | Muthal et al. | 345/541 |
| 5,854,637 A | * | 12/1998 | Sturges | 345/542 |
| 5,949,918 A | * | 9/1999 | McCaffrey | 382/274 |
| 5,959,680 A | * | 9/1999 | Bril | 348/446 |
| 6,067,083 A | | 5/2000 | Glen et al. | |
| 6,069,611 A | * | 5/2000 | Flynn et al. | 345/549 |
| 6,259,487 B1 | * | 7/2001 | Bril | 348/553 |
| 6,654,022 B1 | * | 11/2003 | Egan | 345/557 |

* cited by examiner

*Primary Examiner*—Kee M. Tung
(74) *Attorney, Agent, or Firm*—Volpe and Koenig, P.C.

(57) ABSTRACT

An advanced dot-stretch anti-sparkle technique analyzes the stream of display pixels to determine an optimal time for performing the dot-stretch operation. The system searches the stream of display pixels for a current and previous pixel that are the same color. The system then performs the host access and the dot-stretch during the pixel match. If a pixel match is not detected within a predetermined period of time, the search for two matching pixels is abandoned and the dot-stretch process is implemented.

19 Claims, 5 Drawing Sheets

PALETTE ANTI-SPARKLE ENHANCEMENT

BACKGROUND

The present invention relates generally to the field of displaying video graphics. More particularly, the present invention is a method and apparatus for processing video graphics data to prevent "sparkling" on a video display while processing the video graphics.

The display sub-system of a computer graphics controller normally contains a memory known as a palette or a look up table (LUT). As pixel data is read from the graphics controller frame buffer and processed for display on the monitor, one of the processing steps is to look up the pixel data in the palette. This permits the graphics controller to perform color depth expansion or color corrections, such as gamma correction. For example, in an 8 bit per pixel display mode, the palette is used to expand the 8 bit per pixel data in the frame buffer into 24 bits per pixel for the display. In a 24 bit per pixel display mode, the palette can operate as a gamma correction unit.

A core requirement of a palette is that the host CPU be able to program the palette and re-program the palette as desired. This can involve reading data from the palette or writing new data into the palette. The host CPU reading and writing of the palette must be able to occur concurrently with the normal graphic display.

In order for both the display reads and the host CPU READ or WRITE operation to occur at the same time, a dual-ported memory could be implemented to store the palette data. A dual-ported memory permits two addresses within the memory to be accessed simultaneously, thereby permitting two READs or a combination of READs and WRITEs to be performed concurrently. However, dual-ported memories are much larger then single-port memories and are expensive to implement in silicon. For this reason, a single-ported memory is commonly used for the palette function and access arbitration logic is added to determine whether the graphics display process or the host CPU READ or WRITE request gets access to the single memory port for a particular clock cycle. Although the arbitration logic permits the use of the palette by both the graphics display process and the host CPU, there is a negative effect on the graphics display process when the host CPU wins an arbitration and interrupts the display process. This negative effect is known as "sparkling".

Early prior art graphics controllers did nothing to address the problem. These controllers permitted the data that was output from the palette to the host CPU READ or WRITE process to appear on the display. For example, if the display raster was in a black area of the display and a white data value was read or written by the host CPU, then a white "sparkle" appeared on the display.

Subsequent graphics controllers attempted to ameliorate this sparkle effect by using anti-sparkle circuits which tried to hide the sparkle effect. Anti-sparkle circuits perform what is known as a "dot-stretch", which uses the color of the previous pixel on the display to cover the pixel where the host CPU READ or WRITE operation occurred within the palette. For the prior example where the raster was in a black area of the display, the previous and current pixels would both normally be black. Accordingly, when the host CPU READ or WRITE operation pertains to a white data value from the palette, the previous black pixel will be stretched to cover the white pixel value and the user does not observe the sparkle on the display.

A drawback with anti-sparkle circuits which use this approach is that a visible artifact will be displayed on the screen whenever the previous and current pixels are not the same (or similar) in color. For those applications which perform palette updates often, such as palette cycling for changing the color of a drawn object without re-drawing the object, by changing the palette entries corresponding to the values with which the object was drawn, the standard dot-stretch anti-sparkle method can have serious negative consequences to the graphics that are output to the display.

Accordingly, there exists a need for a system which permits a single-port palette to be utilized by both the graphics display process and a host CPU while limiting the visible artifacts which are displayed by the graphics process to the user.

SUMMARY

The present invention is an advancement over prior standard dot-stretch anti-sparkle techniques by analyzing the stream of display pixels to determine an optimal time for performing the dot-stretch operation. The system searches the stream of display pixels for a current and previous pixel that are the same color. The system then performs the host access and the dot-stretch during the pixel match. If a pixel match is not detected within a predetermined period of time, the search for two matching pixels is abandoned and the dot-stretch process is implemented.

BRIEF DESCRIPTION OF THE DRAWINGS(S)

DESCRIPTION OF THE PREFERRED EMBODIMENT(S)

Figure 1:
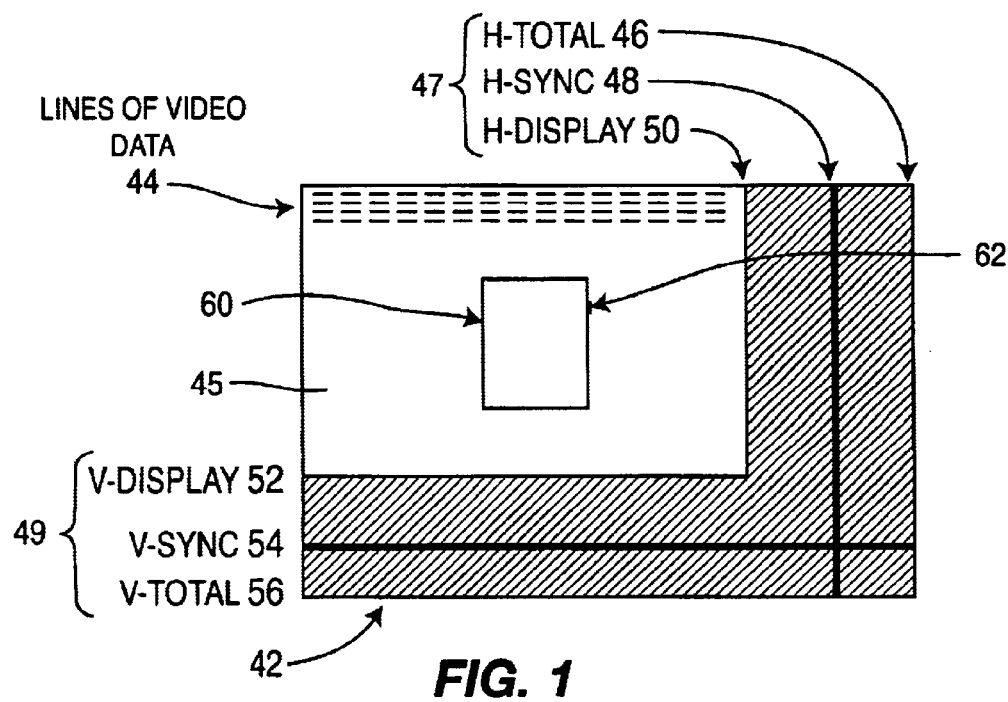
FIG. 1 is a display frame including an active area of contrasting pixels.

The preferred embodiment of the present invention will be described with reference to the drawing figures where like numerals represent like elements throughout. A display frame 42 is shown in FIG. 1. The frame 42 includes a plurality of video data lines 44, each of which includes video data 45 and non-video data. The video data 45 contains video information that will be displayed on a display device such as a CRT monitor, television, LCD panel, etc. The non-video data includes horizontal blanking information 47 and vertical blanking information 49, which is used to synchronize the displaying of the video data 45. The horizontal blanking information 47 includes at least one of the following: a horizontal display value 50, a horizontal total value 46 and a horizontal synchronization signal 48. The vertical blanking information 49 includes at least one of: a vertical display value 52, a vertical total value 56 and a vertical synchronization signal 54. The format of the video data 45 and the non-video data 47, 49 is well known to those skilled in the art. Accordingly, no further discussion will be presented except in relation to the present invention.

As shown in FIG. 1, the video data 44 may include an "active" area 60 which has contrasting pixels. For example, if the active area 60 comprises a black frame on an otherwise white background, if the host CPU were to access the palette, and a prior art dot-stretch method were used to compensate for the host CPU access while the rastering was in the active area, the artifact may appear as a sparkle 62. For certain applications, the occurrence of sparkling becomes more than just a minor annoyance; it can degrade the quality of the application as viewed by the user of the application.

Figure 2:
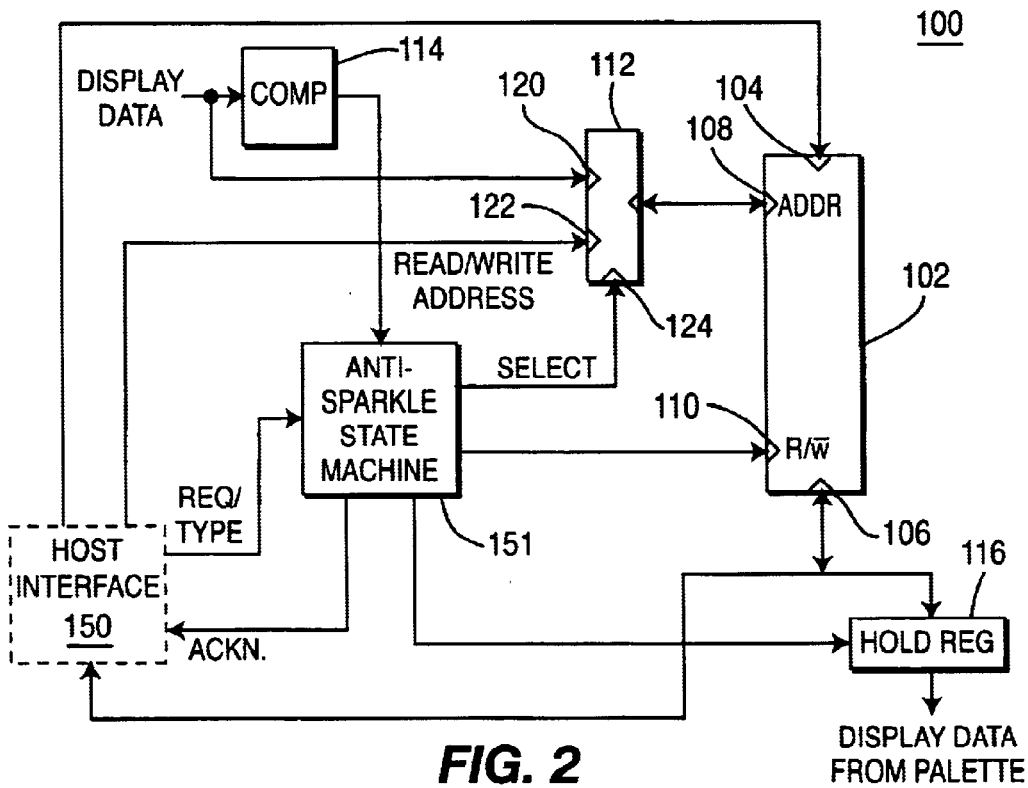
FIG. 2 is a general block diagram of the system of the present invention.

Referring to FIG. 2, an overall block diagram of the system 100 of the present invention is shown. The system 100 includes a memory 102, which is used as a look up table (LUT). The memory 102 will be referred to hereinafter as a palette 102, as is well known to those skilled in the art of graphics processing. The palette 102 includes an input port 104 for writing data into the palette 102, an output port 106 for reading data from the palette 102, an address port 108 for addressing the palette 102 and a control port 110 which instructs the palette 102 whether the operation is a READ operation or a WRITE operation.

The system 100 also includes an anti-sparkle state machine (AS SM) 151, a switch 112 coupled to the address port 108, a comparator 114 and a hold register 116 coupled to the output port 106. The switch 112 has first and second input ports 120, 122. The first input port 120 is coupled to the comparator 114 and the second input port 122 is coupled to the host interface 150. The switch 112 also includes a control port 124 which selects between the first and second input ports 120, 122. If the host interface 150 has an operation to perform, the control port 124 controls the switch 112 to select the address from the host interface 150 on the second input port 122. Otherwise, if no host interface 150 operation is desired, the control port 124 controls the switch 112 to select the address input into the first input port 120.

The comparator 114 compares the address data for two successive pixels of the display raster. If they are the same, it is determined that a match has been found. If the host interface 150 desires to perform a READ or WRITE operation and the address data for two successive pixels matches, the comparator 114 sends a control signal to the ASSM 151. The ASSM 151 receives the control signal from the comparator 114 and the request/type signal from the host interface 150. The request/type signal includes a request for an operation and also instructs the ASSM 151 whether a READ or WRITE 10 operation is desired. The ASSM 151 forwards a READ or WRITE signal to the control port 110 and controls the switch 124 to switch to the second input port 122. The ASSM 151 also instructs the hold register 116 to hold the output of the previous pixel for another cycle. In this manner, the system 100 performs a dot-stretch only on those pixels that have been determined to be the same by the comparator 114. If the comparator 114 determines that the pixels are not the same, the operation requested by the host interface 150, whether a READ or a WRITE, is temporarily stayed until the comparator 114 detects two concurrent pixels which are the same. Since it is undesirable that the system 100 delay the operation requested by the host interface 150 for too long, the ASSM 151 includes a timer (not shown) which will "time out" if no match is found by the comparator 114 within a predetermined duration. If the timer times out, the operation requested by the host interface 150 is performed. Although in these instances a visible dot-stretch may occur, the number of visible artifacts as compared to the prior art method will be significantly diminished.

The system 100 in accordance with the present invention will be explained in greater detail with reference to the detailed block diagram in FIG. 3. Those components in FIG. 3 which are identified by the same numerals as in FIG. 2 are identical components to those shown in FIG. 2. As shown, the system 100 includes a host interface 150, an ASSM 151, two display data registers 130, 132, two switches 112, 134, host read data register 140, display hold register 116, a flip flops 136 and 142, two and gate 138, 180, an OR gate 182, a timer 184, a comparator 114 and the palette 102. It should be noted that although the components are shown as clocked are clocked from a clock signal PCLK, this is not a requirement.

For simplicity of explanation, "normal" graphics processing will be referred to hereinafter as a data processing operation which does not involve a READ or WRITE operation by the host interface 150. Normal graphics processing is when a display pixel data value is input into the system 100. This goes to the address port 108 of the palette 102, with the palette in READ mode 110. The resulting READ data goes to the hold register 116. This results in the data from the palette 102 look up operation being passed to the next block in the display pipeline. "Interrupt" operation is hereinafter defined as the actions taken by the system 100 in response to a host interface 150 READ or WRITE request.

During normal graphics processing, the input display pixel data is clocked into the first register 130 and, one pixel later, clocked to the second register 132. The output from the second register 132 will be input into the switch 112 via the first input port 120. Since no operation is currently being requested by the host interface 150, the switch 112 will be set via the control port 124 to output the display data from the first input port 120. This is forwarded to the address port 108 of the palette 102. The palette 102 accesses the address and outputs the data corresponding to the address on the data output port 106. This data is sent to the display data output register 116 and then forwarded to the display data pipe of the graphics generator.

During interrupt operation, when the host interface 150 would like to perform a READ or WRITE operation, an operation signal is output from the host interface 150 to an AND gate 180, and then to the operation control line 152. The operation control line 152 is fed to the control inputs 124, 135 of the first and second switches 112, 134 and to the input 137 of the flip flop 136. When the operation control line 152 is high, the first switch 112 switches to the second input port 122. Accordingly, the address from the host interface 150 will be output from the switch 112 to the address port 108.

When the operation control line 152 is high, the second switch 134 outputs a signal from the host interface 150 to the R/W input port 110 of the palette 102. When the output from this switch 134 is high, a READ operation is being performed. Accordingly, during normal graphics processing this signal is always high thereby placing the palette 102 in READ mode. When the output from this switch 134 is low, a WRITE operation is being performed. Switch 134 will accept the input from the read/write port 160, and it will output that signal to the R/W input port 110 of the palette 102. For a READ operation the signal output from the read/write signal line 160 is high and for a WRITE operation the signal output is low. If the host interface 150 desires to WRITE data to the palette 102, the host interface 150 will provide this data through the WRITE data input port 104.

If the host interface 150 is performing a READ operation, the palette 102 outputs the desired data via the data output port 106 to the host read data register 140, which forwards the data to the host interface 150. In the case of a READ operation by the host interface 150, the read/write port 160 and the operation control line 152 will both go high. This will cause the Q output of the flip flop 136 to go high, thereby permitting the AND gate 138 to enable the host read data register 140 to output the data to the host interface 150. As shown, since the operation control line 152 is typically low during normal graphics processing when the host interface 150 is not requesting an operation, the $\overline{Q}$ output of the flip flop 136 is normally high. Accordingly, the display data output register 116 is normally enabled to accept the data from the palette data output port 106. When the operation control line 152 goes high during a host interface 150 READ operation, the display data output register 116 is disabled and cannot be overwritten, and the host read data register 140 is enabled to accept data output from the data output port 106. The effect is to cause a dot-stretch in the displayed pixel stream where the host READ occurred.

If the operation control line 152 were permitted to immediately switch the states of both the first and second switches 112, 134, the aforementioned problems with dot-stretching may occur often. Therefore, in accordance with the present invention, in order to minimize visible dot-stretches, the host interface 150 READ or WRITE operation is stayed until an invisible dot-stretch operation can be performed. The staying operation is performed using the OR gate 182, the AND gate 180 and the timer 184 as follows. When the host interface 150 requires a READ or WRITE operation, the operation port 200 goes high. This initiates the timer 184, which may be an independent timer or may count clock pulses. As shown by the OR gate 182, if either a pixel match is found by the comparator 114 or the timer 184 times out, the output of the OR gate 182 goes high and, therefore, the AND gate 180 goes high. The host interface 150 will now have access to the palette 102 for its READ or WRITE operation.

While the host interface 150 READ or WRITE operation is pending, and while the comparator 114 searches for a match, the outputs from both of the registers 130, 132 are compared in the comparator 114. If the pixel data from the current pixel (e.g. from register 130), matches the pixel data from the previous pixel (e.g. from register 132), the output from the comparator 114 goes high. This output is coupled to the OR gate 182, which is further coupled to the AND gate 180. Accordingly, the operation control line 152 will switch both of the switches 112, 134 and the host interface 150 READ or WRITE operation is performed.

Figure 3:
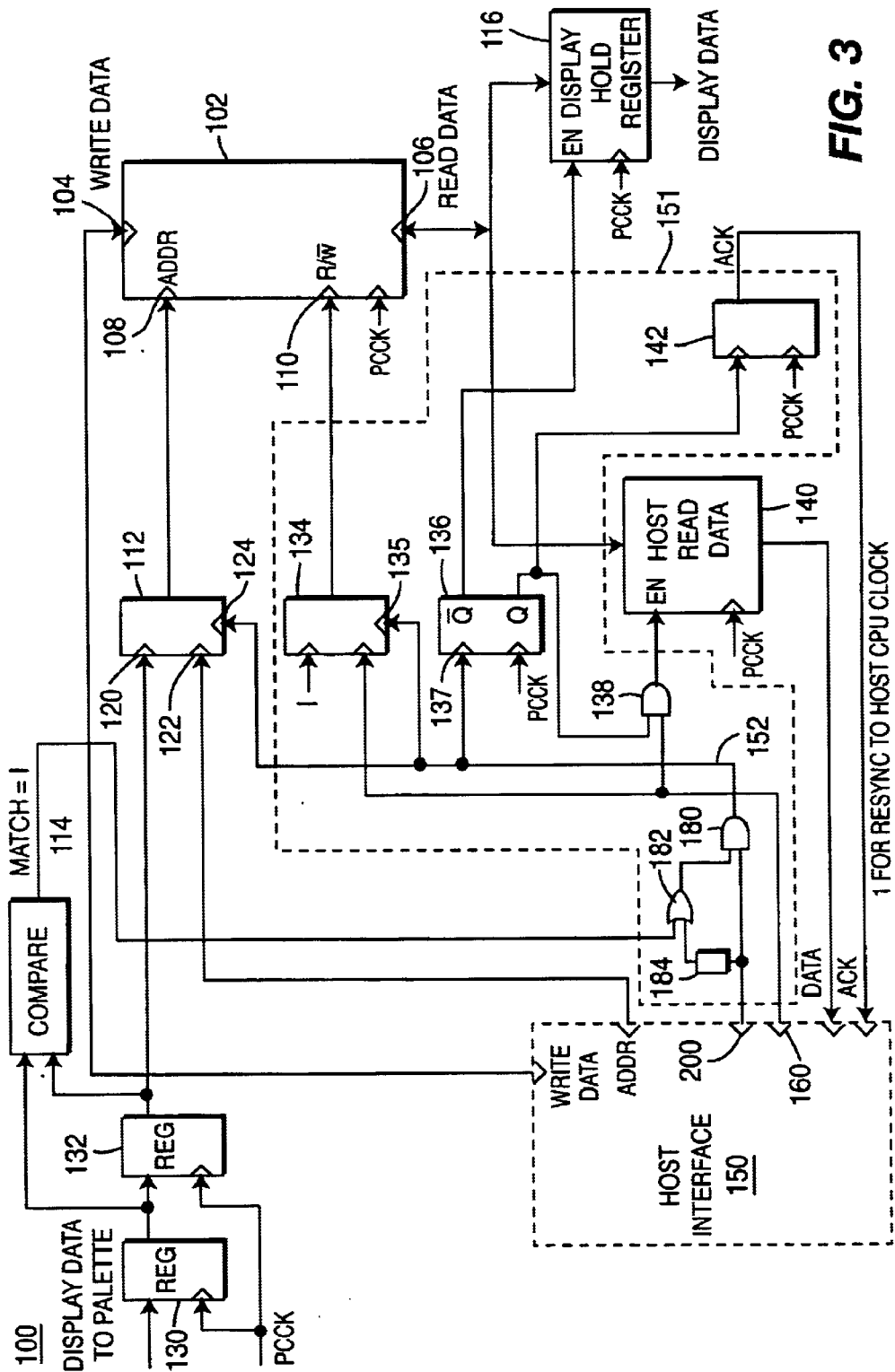
FIG. 3 is a detailed block diagram of the system of the present invention.
Figure 4:
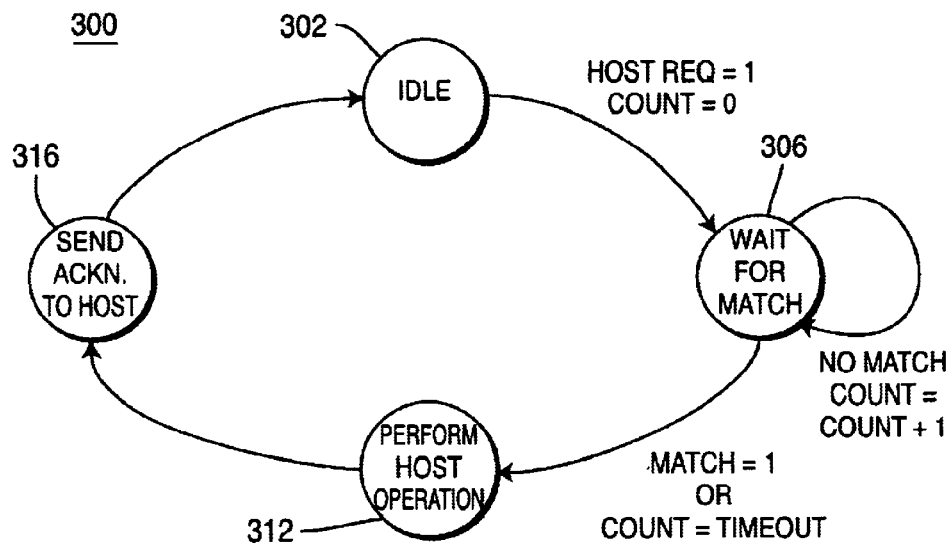
FIG. 4 is a state diagram of the operation of the system of FIG. 3.

Referring to FIG. 4, a state diagram 300 showing the operation of the system 100 of FIG. 3 is shown. A state diagram comprises a plurality of states 302, 306, 312, 316. As shown, for normal graphics operation, the system 100 is in an idle state 302. Therefore, the system 100 usually processes input display data and outputs the corresponding display data. When the host interface 150 desires to perform an operation, the system 100 stays the request until a match between the current pixel and a previous pixel is found. If no match is found, the counter is increased and the current pixel is compared to the next pixel. The system 100 continues in this state 306 until a match is found or the count has reached a predetermined value 310. The system 100 then performs the host operation 312, sends an acknowledgement to the host 316 that the operation was performed and reverts back to the idle state 302 for normal graphics processing.

Figure 5:
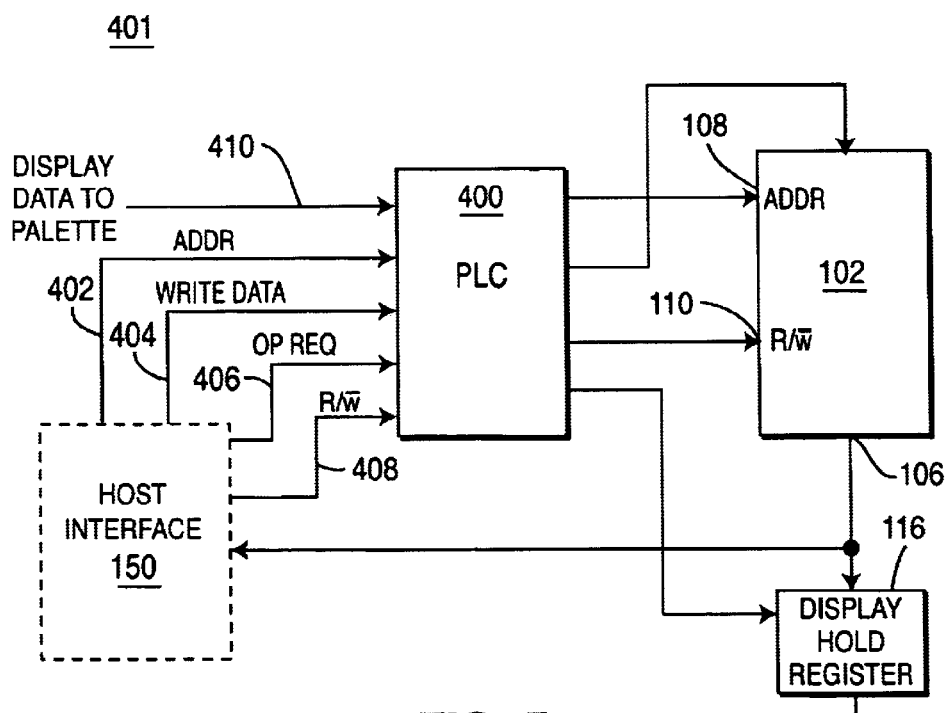
FIG. 5 is an alternative embodiment of the invention using a programmable logic controller.

As those skilled in the art should recognize, although the system 100 has been described with reference to the discrete elements shown in FIG. 3, the ASSM 151 and other portions of the system 100 of the present invention could easily be implemented by using a programmable logic controller (PLC) or other digital programming means. Such an embodiment is shown in FIG. 5. Referring to FIG. 5, the system 401 for this embodiment includes a PLC 400, a palette 102 and a display data output register 116. The PLC 400 can accept the input display data 410, and all of the outputs from the host interface 150 including the address output 402, the write data line 404, the operation request line 406, and the R/W line 408. The PLC 400 accepts all of these inputs and processes these inputs in accordance with the state diagram 300 shown in FIG. 4. This eliminates the need for the plurality of discrete elements. This also permits the PLC 400 to be reprogrammed as desired in order to maximize the settings of the system 401 to each particular application. For example, the duration of the timer may be modified to be a longer or shorter duration.

Figure 6:
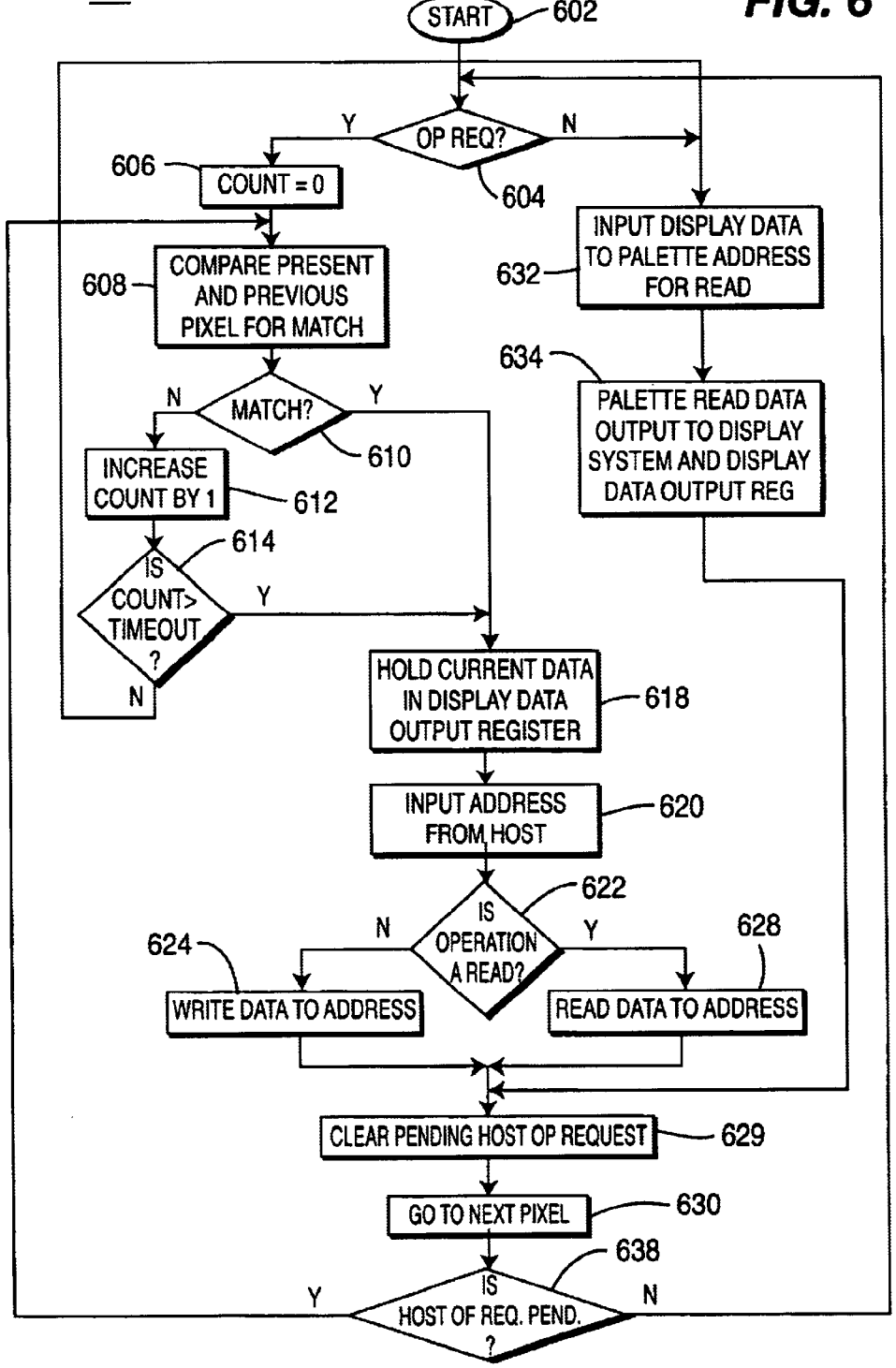
FIG. 6 is a flow diagram of a method in accordance with the present invention.

Referring to FIG. 6, a method (600) in accordance with the present invention is shown. During operation of the system (step 602), the system determines (step 604) whether a host operation is required. If a host operation is not required, the system is in normal graphics processing mode and the input display data is input into the palette (step 632) and the palette outputs the corresponding display output data (step 634). The system then continues to the next pixel (step 630) and repeats the process.

If it has been determined (step 604) that a host operation is required, the system initializes the counter (step 606) and compares the present and previous pixels for a match (step 608). If the pixels do not match (step 610), the count is increased (step 612) and compared against the timeout value (step 614). If the timeout value has not been exceeded, the system continues with processing the input display data pixel (step 632) as aforementioned. If a pixel match has been determined (step 610) or if the count has exceeded the timeout value (step 614), the data in the display data output register is held (step 618) and the address from the host interface is processed (step 620). The system then determines whether the operation is a READ or WRITE (step 622). If the operation is a READ, the palette outputs the data from the address (step 628). If the operation is a WRITE, the palette writes the data to the address (step 624). The pending host operation is then cleared (step 629) and the system then continues to the next pixel (step 630). The system then determines if a host interface 150 operation is pending (step 638). If not, the entire process is repeated. If so, the system is still in interrupt mode and it continues to search for matching pixels (step 608).

Figure 7:
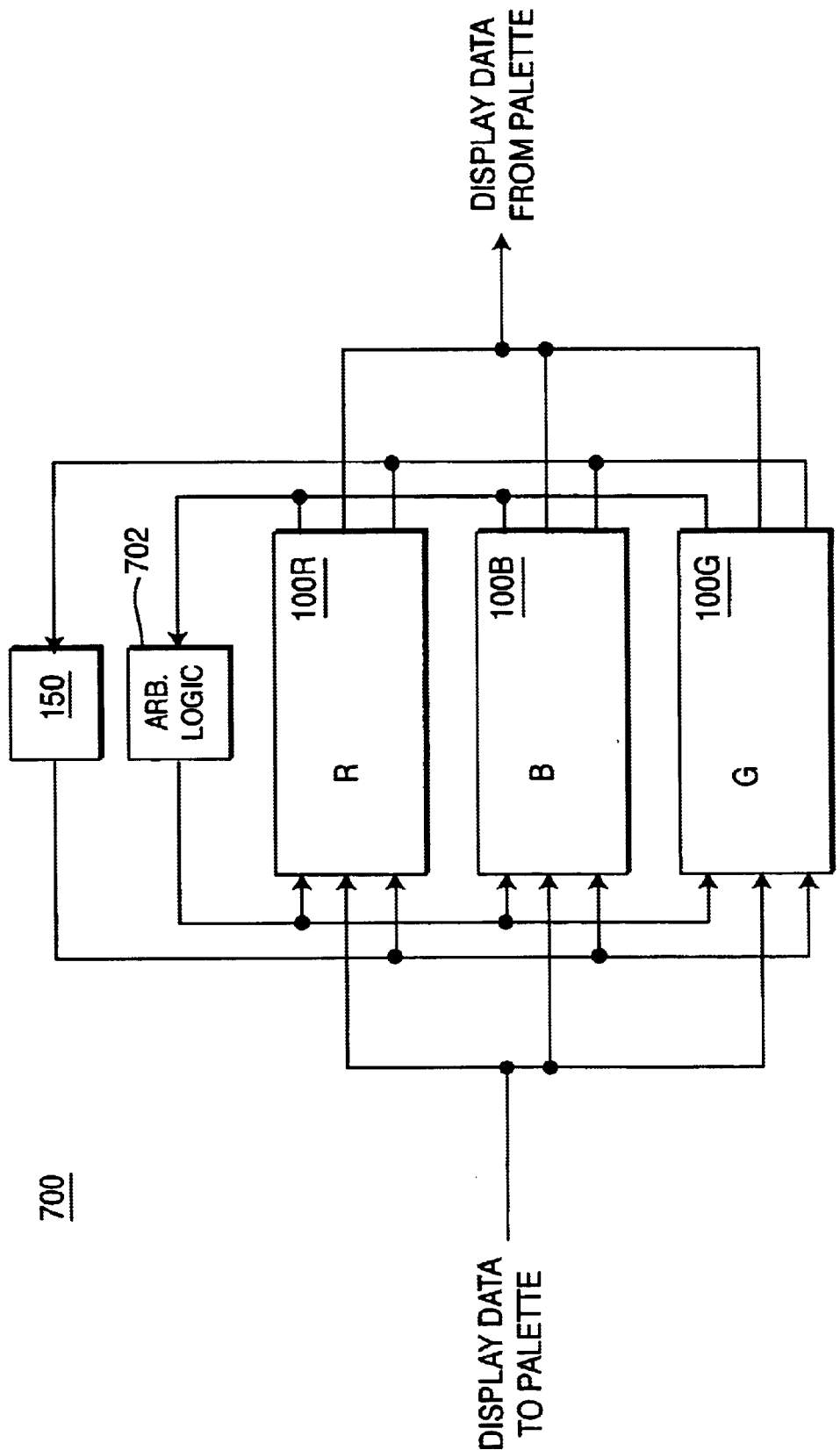
FIG. 7 is a block diagram of an alternative embodiment of the present invention including a palette for each color component.

It should be understood by those of skill in the art that the present invention has been explained with reference to a single pixel. However, what has been previously described is actually a red, blue or green color component of a pixel. Accordingly, the system in accordance with the present invention will actually include the system as shown in FIGS. 3 or 5 for each color component of the pixel. Such an arrangement is shown in an alternative embodiment of the present invention in FIG. 7. As shown, the system 700 includes three subsystems 100R, 100B, 100G, one for each color component of a pixel. Each of the subsystems for the red 100R, blue 100B and green 100G components of the pixels comprises a system 100, 401 as shown and previously described with reference to FIGS. 3 and 5. In order to ensure that a pixel data match is found for all three color components (i.e., R, B, G), this system 700 includes an arbitration logic unit 702 which accepts inputs from each of the subsystems 100R, 100B, 100G. The arbitration logic unit 702 will stay the host interface 150 operation until all three of the subsystems 100R, 100B, 100G have simultaneously determined that a match exists for their respective pixel data components, or the timeout value is reached.

Accordingly, each subsystem 100R, 100G, 100B for color component R, G, B independently searches for a pixel color component match and performs a host operation of only matching components using the invisible dot-stretch method as previously described hereinbefore. If timeout occurs before all three color components R, G, B find matches, then a potentially visible dot-stretch is forced for the remaining color components. In either case, the host interface operation is not allowed to continue until the subsystems 100R, 100G, 100B for all three color components R, G, B have completed pixel component matching and invisible dot-stretching or timeout and regular dot-stretching.

In another alternative embodiment, the system may be programmed to determine which color component R, G, B is important in the comparison being performed for a pixel match. For example, if the red component R of a pixel is being compared and two shades of red are similar, but not identical, then that place could be used for the invisible dot-stretch with minimal affect being seen on the display. An adverse affect of this embodiment is that in an 8 bpp display mode, values that are close together might actually be much different in color. For example, in 8 bpp mode, the palette entry 0 is often black and the palette entry 1 is often white.

Although the invention has been described in part by making detailed reference to the preferred embodiment, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. A system for arbitrating the use of a memory between a graphics system and a host interface to minimize visible artifacts on a display screen by reducing pixel sparkle caused by a processor accessing a look-up table during generation of video, said memory for receiving an input signal and for retrieving a signal corresponding thereto; the system comprising:
   a comparator for comparing two successive display raster input signals from said graphics system, the two successive display raster input signals corresponding to two successive display elements, and determining matching input signals;
   arbitration logic for receiving an operation signal requiring a memory access by said host interface and for staying said memory access until said comparator determines a match of said two successive input signals; and,
   a hold register for receiving said retrieved signal;
   whereby said hold register stores said retrieved signal for a predetermined duration when a match has been determined by said comparator.

2. The system of claim 1, whereby the arbitration logic further comprises a timer for timing the duration of said stay.

3. The system of claim 2, whereby the arbitration logic ceases said stay when said duration exceeds a predetermined value.

4. The system of claim 1, whereby said operation signal comprises a READ operation.

5. The system of claim 1, whereby said operation signal comprises a WRITE operation.

6. The system of claim 1, whereby said comparator determines a match when said two successive input signals are the same.

7. The system of claim 1, whereby said comparator determines a match when said two successive input signals are within a predetermined range from each other.

8. The system of claim 7, whereby said predetermined range is based upon a color value.

9. The system of claim 7, whereby said predetermined range is based upon memory address.

10. A system for reducing visible artifacts on a display screen by reducing pixel sparkle caused by a processor accessing a look-up table during generation of video during a READ or WRITE operation by a host interfaces, the system including:
    a palette, having a first data input port and a data output port, said first input port for receiving a display raster data input signal and producing a data output signal at said data output port in response thereto;
    a comparator for comparing said data input signal with subsequent data input signal to determine if said data input signal matches said subsequent data input signal, the data input signal and the successive data input signal corresponding to two successive display elements;
    a hold register, responsive to said comparator, for receiving and storing said data output signal;
    a switch, having first and second input ports and an output port, said first input port being coupled to a graphics path, said second input port being coupled to said host interface and said output being coupled to said palette;
    a timer, coupled to said host interface and said switch, which is initialized when said host interface generates a READ or WRITE operation;
    whereby said switch switches from said first input port to said second input port and said hold register stores said output signal when said comparator determines a match of said data input signal and the successive data input signal or when said timer reaches a predetermined value.

11. A method for arbitrating the use of a memory between a graphics system and a host interface to minimize visible artifacts on a display screen by reducing pixel sparkle caused by a processor accessing a look-up table during generation of video, said memory for receiving a plurality of input signals and retrieving a signal in response to each input signal, the method comprising:
    comparing two successive display raster input signals from said graphics system and determining matching input signals, the two successive display raster input signals corresponding to two successive display elements;
    receiving an operation signal requiring a memory access by said host interface;
    staying said memory access until said comparator determines a match of said two successive input signals; and
    storing said retrieved signal for a predetermined duration when a match has been determined.

12. The method of claim 11, further comprising timing the duration of said stay.

13. The method of claim 12, further comprising ceasing said stay when said duration exceeds a predetermined value.

14. The method of claim 11, whereby said operation signal comprises a READ operation.

15. The method of claim 11, whereby said operation signal comprises a WRITE operation.

16. The method of claim 11, whereby said comparing step determines a match when said two successive input signals are the same.

17. The method of claim 11, whereby said comparing step determines a match when said two successive input signals are within a predetermined range from each other.

18. The method of claim 17 whereby said predetermined range is based upon a color value.

19. The method of claim 17 whereby said predetermined range is based upon memory address.

* * * * *

UNITED STATES PATENT AND TRADEMARK OFFICE
CERTIFICATE OF CORRECTION

PATENT NO. : 6,774,903 B1
APPLICATION NO. : 09/707037
DATED : August 10, 2004
INVENTOR(S) : David Glen It is certified that error appears in the above-identified patent and that said Letters Patent is hereby corrected as shown below:

<u>Column 3,</u>
Line 24, after "machine" delete "(AS SM)" and insert -- (ASSM) --.

<u>Column 8,</u>
Line 12, after "host" delete "interfaces" and insert -- interface --.

Signed and Sealed this

Fourth Day of July, 2006

JON W. DUDAS
*Director of the United States Patent and Trademark Office*